(12) United States Patent
Hansen

(10) Patent No.: US 7,803,302 B2
(45) Date of Patent: Sep. 28, 2010

(54) VACUUM INFUSION BY MEANS OF A SEMI-PERMEABLE MEMBRANE

(75) Inventor: Tim Møller Hansen, Vamdrup (DK)

(73) Assignee: LM Glasfiber A/S, Lunderskov (DK)

( * ) Notice: Subject to any disclaimer, the term of this patent is extended or adjusted under 35 U.S.C. 154(b) by 289 days.

(21) Appl. No.: 11/791,643

(22) PCT Filed: Nov. 30, 2005

(86) PCT No.: PCT/DK2005/000765

§ 371 (c)(1),
(2), (4) Date: May 25, 2007

(87) PCT Pub. No.: WO2006/058540

PCT Pub. Date: Jun. 8, 2006

(65) Prior Publication Data

US 2008/0093761 A1    Apr. 24, 2008

(30) Foreign Application Priority Data

Nov. 30, 2004    (DK) ............................... 2004 01868

(51) Int. Cl.
*B29C 70/44*   (2006.01)
*B29C 45/00*   (2006.01)
*B32B 37/00*   (2006.01)

(52) U.S. Cl. ..................... 264/258; 264/510; 264/553; 264/571

(58) Field of Classification Search ................ 264/258, 264/510, 553, 571
See application file for complete search history.

(56) References Cited

U.S. PATENT DOCUMENTS 4,132,755 A * 1/1979 Johnson ..................... 264/553

6,159,414 A * 12/2000 Tunis et al. ................. 264/510

(Continued)

FOREIGN PATENT DOCUMENTS

EP    1 555 104 A1    7/2005

(Continued)

*Primary Examiner*—Khanh Nguyen
*Assistant Examiner*—Carson Gross
(74) *Attorney, Agent, or Firm*—The Nath Law Group; Joshua B. Goldberg; Tanya E. Harkins

(57) ABSTRACT

Method of producing an oblong shell member made of fiber composite material by means of vacuum infusion, where the fiber material is impregnated with liquid polymer. A mould is applied with a mould cavity, in which a fiber insertion (3) with a first lateral face (1) and a second lateral face (2) is placed, and where said fiber insertion includes a plurality of fiber layers and a distribution layer (4), said distribution layer allowing a higher rate of flow for the liquid polymer than the fiber layers. A semi-permeable membrane (5) is placed opposite the first lateral face (1) of the fiber insertion, said semi-permeable membrane being substantially permeable to gasses and substantially impermeable to liquid polymer and further communicating with a vacuum source The distribution layer (4) is placed inside the fiber insertion (3) with fiber layers on both sides and is interrupted by a zone (6) opposite the semi-permeable membrane (5) Liquid polymer is directed via inlet channels (7, 8) to the distribution layer (4), thus creating a flow front (9, 10) between the distribution layer (4) and the second lateral face (2), said flow front moving through the central zone (6) towards the semi-permeable membrane (5)

24 Claims, 3 Drawing Sheets

U.S. PATENT DOCUMENTS

2003/0011094 A1 * 1/2003 Filsinger et al. ............. 264/102
2004/0140587 A1 * 7/2004 Hadley ....................... 264/257

FOREIGN PATENT DOCUMENTS

GB 2 381 493 A 5/2003
GB 2381493 A * 5/2003
WO 03/064144 A1 8/2003

* cited by examiner

VACUUM INFUSION BY MEANS OF A SEMI-PERMEABLE MEMBRANE

TECHNICAL FIELD

The invention relates to a method according to the preamble of claim 1.

Thus the invention relates to a method of producing fibre composite mouldings by means of VARTM (vacuum assisted resin transfer moulding), where liquid polymer, also called resin, is filled into a mould cavity, in which an insert of fibre material has been placed in advance, and where a vacuum is generated in the mould cavity hereby drawing in the polymer. The polymer can be thermoset or thermoplastic.

BACKGROUND ART

Vacuum infusion is a process used for moulding fibre composite mouldings, where uniformly distributed fibres are layered in one of the mould parts, said fibres being rovings, i.e. bundles of fibre bands, bands of rovings or mats, which are either felt mats made of single fibres or woven mats made of fibre rovings. The second mould part, which is often made of a resilient vacuum bag, is subsequently placed on top of the fibre material. By generating a vacuum, typically 80 to 90% of the total vacuum, in the mould cavity between the inner side of the mould part and the vacuum bag, the liquid polymer can be drawn in and fill the mould cavity with the fibre material contained therein. So-called distribution layers and distribution tubes, also called inlet channels, are used between the vacuum bag and the fibre material in order to obtain as sound and efficient a distribution of polymer as possible. In most cases the polymer applied is polyester or epoxy, and the fibre reinforcement is most often based on glass fibres or carbon fibres.

During the process of filling the mould, a vacuum is generated by the vacuum channels in the mould cavity, said vacuum in this connection being understood as a negative pressure, whereby liquid polymer is drawn into the mould cavity via the inlet channels in order to fill said mould cavity. From the inlet channels the polymer disperses in the mould cavity as a flow front moves towards the vacuum channels. Thus it is important to position the inlet channels and the vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus dry spots are areas, where the fibre material has not been impregnated, and where there can be air pockets, which are difficult to remove by controlling the vacuum pressure and possibly an overpressure at the inlet side. In connection with vacuum infusion employing a solid mould part and a resilient mould part in the form of a vacuum bag, the dry spots can be repaired after the process of filling the mould by for example perforating the cloth in the respective locations and by sucking out air by means of a syringe needle. Liquid polymer can optionally be injected at the relevant location, which can for example be done by means of a syringe needle as well. This is a time-consuming and tiresome process. In the case of large mouldings, the staff has to stand on the vacuum bag, which is not desirable, especially not when the polymer has not hardened, as it can result in deformations in the inserted fibre material and thus result in local weakenings of the structures.

Patent literature discloses examples of employing a semi-permeable membrane for distributing the vacuum pressure and thus reducing the above problems. In this connection the term semi-permeable membrane is understood as a membrane, which is permeable to gases but impermeable to liquid polymer. Thus if a semi-permeable membrane is placed over the fibre insertion, air pockets can be removed easily.

US 2003/0011094 A1 discloses the method of placing a distribution layer, through which the liquid polymer quickly can disperse, at one side of the fibre insertion and a semi-permeable membrane at the opposite side of the fibre insertion. One disadvantage of this method is that the finished body has an outer distribution layer without any fibres or with only a small amount of fibres, and thus it does not contribute to the bending rigidity of the body to any serious extent.

In connection with producing relatively thick fibre composite mouldings by means of vacuum infusion, it is known to place intermediate distribution layers or flow layers inside the fibre insertion, so that the liquid polymer can flow into the fibre insertion through said distribution layers or flow layers and spread perpendicularly into the fibre material. However, this method can cause problems with regard to dry spots, as it can result in a plurality of converging flow fronts, which can encase air pockets.

BRIEF DESCRIPTION OF THE INVENTION

The object of the present invention is to provide a new and improved method of producing an oblong shell member of fibre composite material by means of vacuum infusion, where the time of filling the mould as well as the risk of dry spots can be reduced.

According to the invention this object is achieved by the distribution layer being placed inside the fibre insertion with fibre layers on both sides and bordering on a zone, said zone extending in the longitudinal direction of the shell member and being positioned opposite the semi-permeable membrane, where liquid polymer is directed through inlet channels to the distribution layer, thus creating a flow front between the distribution layer and the second lateral face, said flow front moving through the zone towards the semi-permeable membrane. At the beginning the liquid polymer moves perpendicular out of the distribution layer. Between the distribution layer and the semi-permeable membrane the flow front moves substantially directly towards the membrane, whereas, at the side of the distribution layer opposite the semi-permeable membrane, the flow front moves towards the zone and through said zone towards the semi-permeable membrane. Thus the zone ensures a direct access for the flow front through non-impregnated fibre material, hereby to a great extent reducing the risk of dry spots. By placing the distribution layer inside the fibre insertion a strong structure can be obtained. In order to obtain a member with great bending rigidity, the fibre-reinforced material is to be as far away from the centre of gravity axis as possible. A distribution layer with a high permeability does not contribute to the bending rigidity to any great extent, and thus placing it outermost is disadvantageous. Having a distribution layer outermost in addition to having a distribution layer inside the fibre material can, however, be desirable in order to further improve the process of filling the mould additionally. However, with a distribution layer inside the fibre insertion, an additional distribution layer need not be very thick. The semi-permeable membrane ensures an efficient evacuation of air while avoiding the formation of air pockets.

According to a preferred embodiment, the zone is a central zone, dividing the distribution layer into two distribution layer areas, where liquid polymer is directed via the inlet channels to the distribution layer areas, thus creating two flow fronts between the distribution layer and the second lateral face, said two flow fronts converging in the fibre insertion to a common flow front, which moves through the central zone towards the semi-permeable membrane. Initially, the liquid polymer moves perpendicular out of the two distribution layer areas. Between the distribution layer and the semi-permeable membrane the flow front moves substantially directly towards the membrane, whereas, at the side of the distribution layer opposite the semi-permeable membrane, the flow front moves towards the second lateral face and then inwards towards the central zone, where the flow fronts from the two distribution layers meet and move through the central zone and upwards towards the semi-permeable membrane. Thus the central zone ensures a direct access for the flow front/fronts through non-impregnated fibre material, hereby to a great extent reducing the risk of dry spots.

The distribution layer can for instance be made of a porous core material, for example balsa, provided with channels, which are formed like recesses in the surface, and which extend along the plane of the distribution layer perpendicular to the longitudinal direction of the blade. Alternatively the distribution layer can be made of a net or a fibre mat with a high permeability.

According to the invention, an additional distribution layer can be placed at the second lateral face of the fibre insertion. Hereby it can be further ensured that the flow fronts from the two distribution layers converge without forming dry spots. The additional distribution layer can be substantially thinner than the distribution layer, which is divided into two distribution layer areas.

According to one embodiment, the fibre insertion can be made of a main laminate, which is a longitudinal reinforcement section in a blade shell half for a blade of a wind turbine. Such a main laminate makes the blade of the wind turbine rigid and absorbs great stress loads during the operation of the wind turbine. As the main laminate in a blade of a wind turbine is subjected to major loads, avoiding dry spots is desirable. As the main laminate provides the blade with greater rigidity the further away the impregnated fibre material is from the central axis of the blade, a distribution layer at a distance from the outside of the fibre insertion is advantageous.

According to one embodiment the main laminate is 10 to 100 mm, 20 to 80 mm or 30 to 50 mm thick, and 30 to 200 cm, 40 to 150 cm or 50 to 120 cm wide.

According to an advantageous embodiment, the semi-permeable membrane is at a maximum as thick as the main laminate is wide, where a non-permeable vacuum bag extends at each side of the semi-permeable membrane to the edges of the blade shell half Optionally the vacuum bag can extend from one edge of the blade shell half across the semi-permeable membrane to the second edge of the blade shell half.

According to an advantageous embodiment, the central zone is 100 to 200 mm, 120 to 180 mm or 130 to 170 mm wide. It has turned out that such widths ensure achieving the intentional effect to the greatest possible extent.

Vacuum channels can be provided along the edges of the blade shell half. Hereby the parts of the blade shell half at each side of the main laminate are injected efficiently with liquid polymer.

According to a preferred embodiment, inlet channels are provided along the longitudinal edges of the semi-permeable membrane. Hereby the liquid polymer can easily flow to the distribution layer and continue into the main laminate.

According to a particularly advantageous embodiment, an oblong membrane bag with a front, a back, a central vacuum channel and two inlet channels is applied, said two Inlet channels extending on their respective sides of the vacuum channel, where the front opposite the vacuum channel is formed by the semi-permeable membrane and the front opposite the inlet channels is permeable to liquid polymer. As a result the time for preparing the process of filling the mould can be reduced, since the semi-permeable membrane and the inlet channels can be placed correctly in relation to each other in one and the same flow of work.

According to a particular advantageous embodiment, the membrane bag includes a semi-permeable membrane material and a non-permeable cloth, which are joined in the longitudinal direction, for instance by means of welding, to form the longitudinal vacuum channel and the inlet channels on each side of said longitudinal vacuum channel, where the semi-permeable membrane material in the area of the inlet channels is perforated so that it is permeable to liquid polymer. Such a membrane bag is simple to produce. The vacuum channel can be filled with a distance layer, ensuring that the vacuum channel does not collapse when communicating with a vacuum source. Upon completion of the infusion, the liquid polymer in the inlet channels can be drawn out completely, as the inlet channels are folded up. Thus wastage of liquid polymer is avoided to the greatest possible extent. At the same time it is possible to inject large amounts of liquid polymer within a short time.

BRIEF DESCRIPTION OF THE DRAWINGS

The invention is explained in detail below with reference to an embodiment shown in the drawing, in which.

BEST MODE FOR CARRYING OUT THE INVENTION

Figure 1:
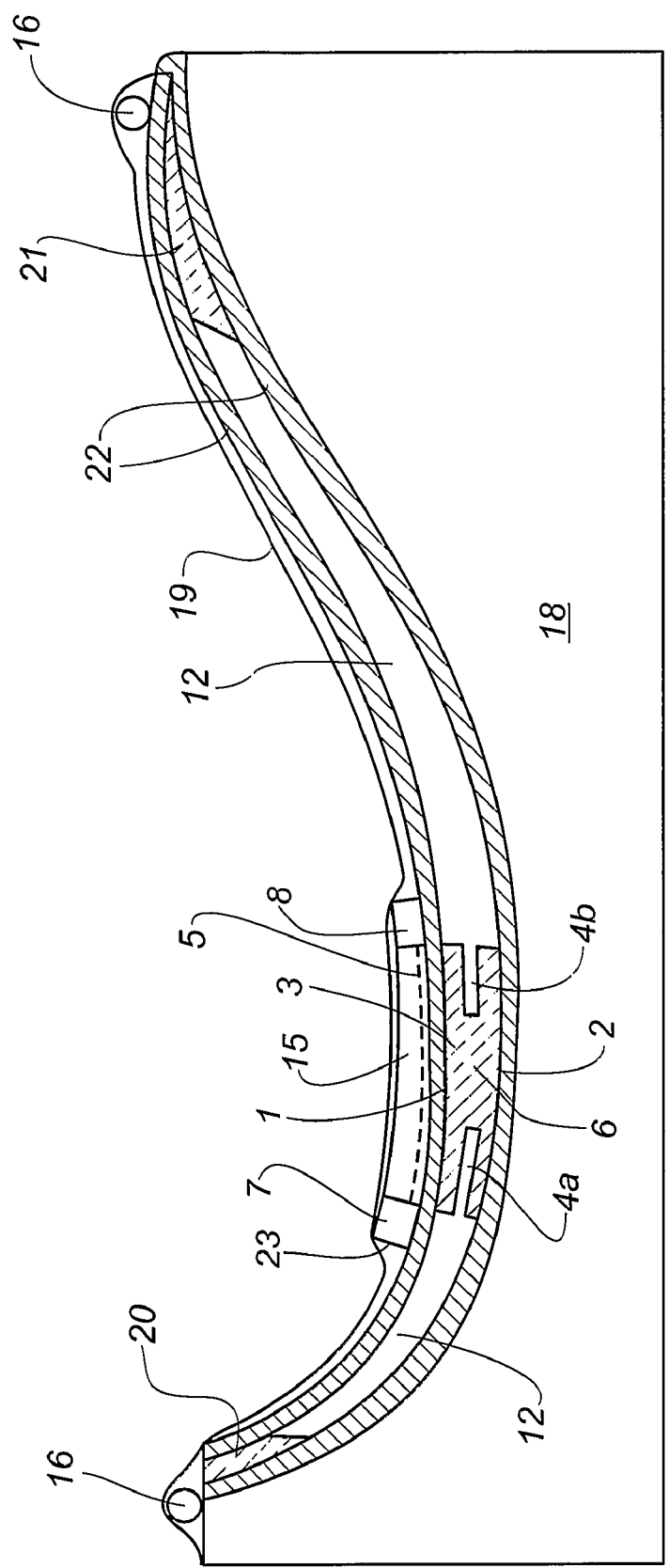
FIG. 1 is a diagrammatic cross section through an arrangement for carrying out the method according to the invention.

The cross section at view of FIG. 1 through a mould for manufacturing a blade shell half for a blade of a wind turbine by vacuum infusion shows a solid mould part 18 with a top side matching the exterior side of the completed blade shell half. First, a so-called gel coat is placed on the inner side of the mould part 18, said gel coat later on forming the outside of the completed blade shell half. Fibre material 3, 22 and balsa 12 are placed on top of the gel coat. The fibre Insertion 3 forming the main laminate of the blade is placed at the lowest part of the mould and includes a first lateral face 1 facing upwards, and a second lateral face 2 facing downwards. On top of the first lateral face 1 of the main laminate, a membrane bag 23 is placed, which is shown in greater detail in FIG. 3, and which includes a vacuum channel 15 with a semi-permeable membrane 5 pointing towards the main laminate 3, and two inlet channels 7, 8. Vacuum channels in the form of perforated tubes 16 are placed at the flanges of the mould. An air-tight vacuum bag 19 is placed at the very top, and together with the solid mould part 18 it defines the mould cavity. Between the fibre material 22 closest to the vacuum bag 19 and the vacuum bag 19, a so-called tear-off layer not shown and a distribution layer not shown can be placed, said layers ensuring the distribution of liquid polymer to the internal surface of the entire blade shell half. In the area below the semi-permeable membrane 5 the distribution layer has been omitted. During the process of filling the mould, the vacuum channels 15, 16 communicate with a vacuum source, and the inlet channels 7, 8 communicate with a polymer source with liquid polymer. The vacuum in the vacuum channels 2 generate a vacuum in the mould cavity between the solid mould part 1 and the vacuum bag 19. As a result polymer is drawn through the inlet channels 7, 8 into the mould cavity, as it spreads into the fibre material 3, 22 and impregnates the latter. When hardening is completed, the vacuum bag 19 and the membrane bag 23 as well as the not shown distribution and tear-off layers are removed.

Edge reinforcements 20, 21 made of fibre material are placed at the front edge or leading edge of the blade shell half shown to the left in FIG. 1, and at the rear edge or trailing edge of the blade shell half shown to the right in FIG. 1. As it appears from FIG. 1, part of the mould cavity is filled by plate-shaped balsa 12 in the area between the main laminate 3 and the edge reinforcements 20, 21. This flat piece of balsa material is porous and thus it is permeable to liquid polymer. A distribution layer 4 of balsa is placed inside the main laminate 3 and includes two distribution layer areas 4a and 4b, which are divided by a central zone 6 extending in the longitudinal direction of the blade shell part. It does not appear from the drawing, but the distribution layer areas 4a, 4b of balsa, are provided with channels formed like recesses in the surface and extending in the plane of the distribution layer perpendicular to and In the longitudinal direction of the blade shell half. These channels ensure that liquid polymer can flow quickly in the plane of the distribution layer.

Due to the vacuum in the mould cavity, liquid polymer flows from the inlet channels 7, 8 into the mould cavity during the process of filling the mould. The vacuum channels 16 draw the liquid polymer towards the front edge and the rear edge of the blade shell half, and the vacuum channel 15 draws the liquid polymer into the fibre insertion 3 of the main laminate.

FIGS. 2a-f show how the fibre material 3 of the main laminate is impregnated with liquid polymer during the process of filling the mould. The distribution layer areas 4a and 4b are formed integral with or connected to the balsa areas beside the main laminate, and in the centre of the main laminate they are divided by a central longitudinal zone 6, which does not include any distribution material. Thus this zone 6 is filled up with the same fibre material as the areas opposite and below the distribution layer 4. The fibre insertion side of the main laminate 3 opposite the semi-permeable membrane 5 is provided with an additional distribution layer 11 in the form of a glass fibre layer with a high permeability, meaning that the liquid polymer can flow more quickly through this layer 11 than the fibre material 3. This additional distribution layer 11 can abut the gel coat directly, or it can be on top of a thin layer of fibre material.

FIG. 2b is a diagrammatic view of the start of the process of filling the mould, where the inlet channels 7, 8 are filled with liquid polymer 17, indicated with the dark colour. In FIG. 2c the balsa 12 and the distribution layer areas 4a, 4b have been soaked with liquid polymer 17. In FIG. 2d the flow fronts 9, 10 of the polymer have moved out into the fibre material 3. In FIG. 2e the flow fronts 9, 10 have converged into a common flow front, which, cf. FIG. 2f, moves upwards towards the semi-permeable membrane 5. The semi-permeable membrane 5 ensures that the flow fronts 9, 10 on top of the distribution layer 4 move essentially vertically towards the membrane without coming into contact with each other in the area of the central zone 6. Below the distribution layer 4, the flow fronts 9, 10 move parallel to the distribution layer 4 and join each other below the central zone 6. Subsequently the converging flow front moves upwards through the central zone 6 towards the membrane 5. Thus the central zone 6 without any distribution layer implies that dry spots or air pockets do not arise in the fibre insertion 3.

The additional flow layer assists in ensuring that the flow fronts 9 10 do not converge so that an air pocket or a dry spot arises in an area below zone 6.

Figure 2:
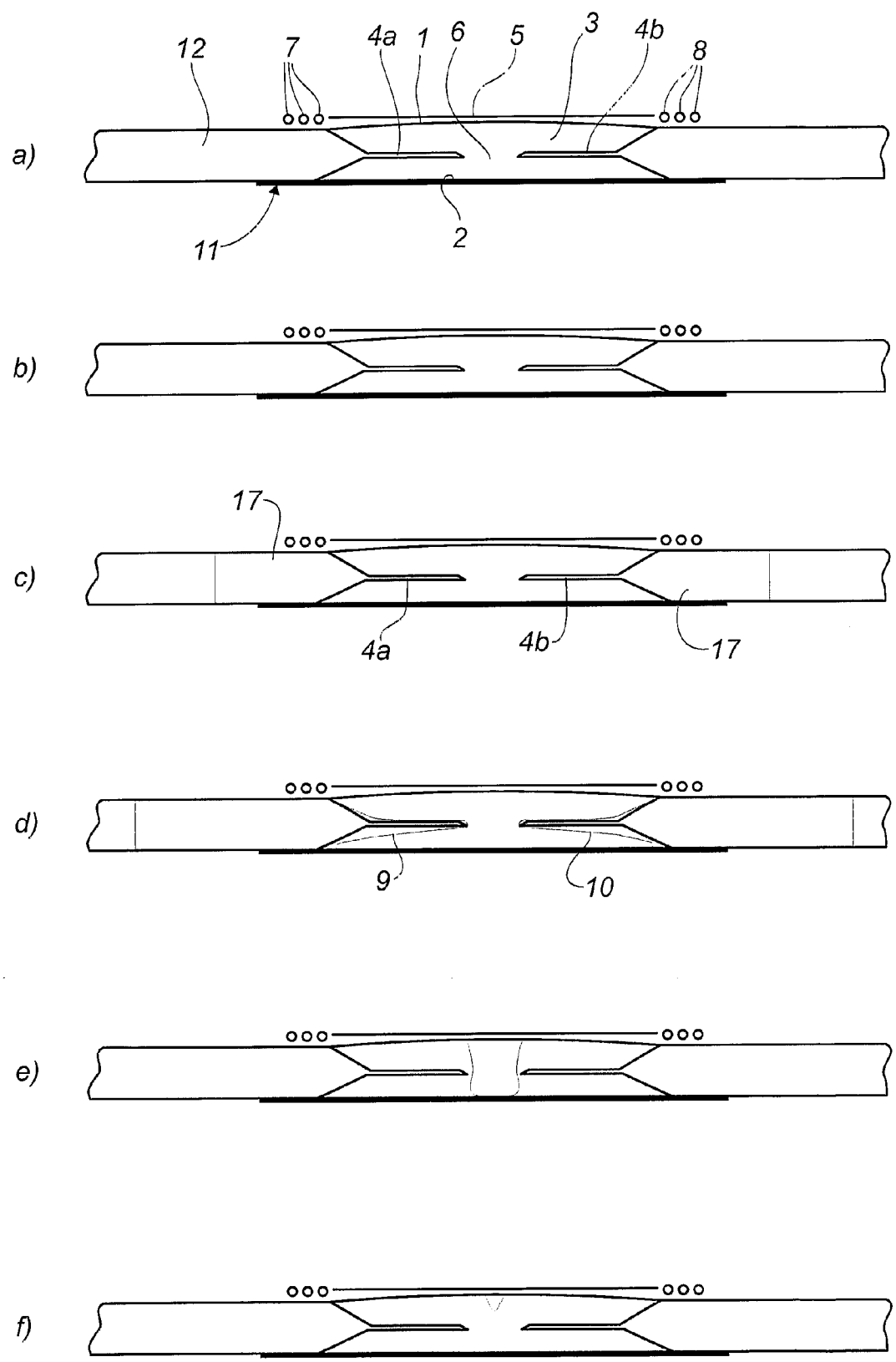
FIGS. 2a-f are diagrammatic cross sections showing how liquid polymer spreads in the fibre insertion by carrying out the method according to the invention.

In FIGS. 1 and 2 the distribution layer 4 is made of balsa, but it can just as well be made of any other material with sound flow characteristics, for instance a loosely woven glass fibre mat or the like net structure with a high permeability and a large capacity.

In connection with the impregnating process it is of vital importance to ensure that air pockets do not arise inside the main laminate 3, and one important measure is inter alia that the resin is quickly directed from the inlet channels 7, 8 and down to the distribution layer 4 or the two distribution layer areas 4a, 4b. This is for instance ensured by using materials, which ensure suitable flow characteristics. For example, the fibre materials have typically a structure which causes the flow time of the resin to be faster across the plane of the fibre material than along the plane. Thus the resin is directed from the inlet channels 7, 8 more quickly (or relatively quickly) and through the uppermost fibre material 22 and downwards to the balsa 12 and is directed towards the vacuum channel 15 for a prolonged length of time. This is further ensured by the fibre material 22 being relatively thin. By using materials with the right permeability in different directions and by proper dimensioning of these materials, the correct flow characteristics can be ensured in different directions.

The balsa 12 is porous and furthermore it is typically shaped with channels extending between the two fibre material layers 22 as well as in and transverse to the longitudinal direction of the blade shell half. The channels can for instance be formed by placing balsa blocks on a permeable cloth or net. These balsa blocks can for instance be placed such that the different channels are placed at intervals of 25 mm from each other. Thus the balsa layer 12 ensures sound flow characteristics and the resin is quickly directed from the inlet channels 7, 8 and to the distribution layer areas 4a, 4b.

It is also possible to use another distribution layer or other distribution means than the above balsa layer for directing the resin quickly from the inlet channels 7, 8 to the distribution layer areas 4a, 4b. In this connection it is important that the distribution layer or distribution means ensure sound flow characteristics. Thus embodiments are also possible where the inlet channels 7, 8 communicate directly with the distribution layer areas 4a, 4b, for instance by means of channels or holes.

In order to ensure that air pockets do not arise during the process of impregnation, it is furthermore important that the thickness of the main laminate 3 and the width of the zone 6 are suitably dimensioned relative to one another. Thus the width of the zone 6 must be greater, for example 2 to 3 times greater and typically approximately five times greater, than the thickness of the piece of the main laminate 3 between the distribution layer areas 4a, 4b and the second lateral face 2 of the main laminate 3. The main laminate 3 including a fibre insertion ensures that the resin flows faster in the direction between the first and the second lateral faces 1, 2 than In the directions parallel to said two lateral faces 1, 2. Hereby the resin is directed relatively fast from the distribution layer areas 4a, 4b and through the areas of the main laminate 3, which are placed between the distribution areas 4a, 4b and the first lateral face 1 of the main laminate 3, and between the distribution layer areas 4a, 4b and the second lateral face 2 of the main laminate 3 respectively, while the flow fronts 9, 10 are directed relatively slowly towards the central zone 6. Thus finally the flow fronts form a converging flow front moving upwards through the central zone 6 towards the membrane 5.

Figure 3:
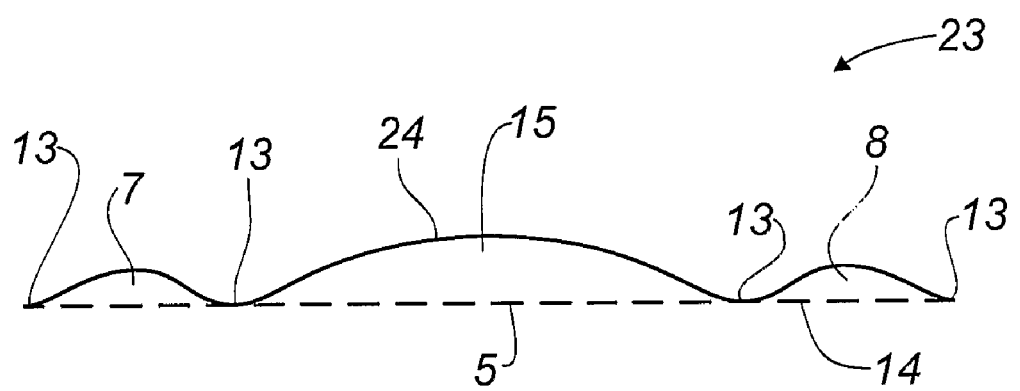
FIG. 3 shows a membrane bag for carrying out the method according to the invention.

FIG. 3 shows a more detailed diagrammatic cross section at view through the membrane bag 23. The membrane bag includes a semi-permeable membrane 5, which is welded together with a gas-impermeable cloth 24 along the four longitudinal welding seams. Thus a longitudinal central vacuum channel 15 and two inlet channels 7, 8 extending longitudinally along the sides of said central vacuum channel have been formed. In the area with the inlet channels 7, 8 the semi-permeable membrane 5 is provided with perforations 14 making it permeable to liquid polymer Distance material in the form of a three-dimensional net or the like can be placed in the vacuum channel 15 in order to ensure that the membrane 15 and the cloth 14 do not collapse during the process of filling the mould, during which a vacuum is generated in the vacuum channel 15. The inlet channels 7, 8 can be dimensioned to allow the passage of a large amount of liquid polymer through them. At the completion of the process of filling the mould the polymer source is closed prior to closing the vacuum source with the result that the inlet channels 7, 8 can easily be emptied of liquid polymer. This reduces waste of polymer. This vacuum bag can quickly and easily be placed on top of the main laminate before a vacuum bag is placed on top of the entire fibre insertion According to the embodiment shown here, the width of the semi-permeable membrane 5 is fairly concurrent with the width of the main laminate 3. However, the width of the semi-permeable membrane 5 can also be smaller than the main laminate, but as a minimum it must corresponding the width of the longitudinal zone 6 in order to ensure that air pockets do not arise. Theoretically, instead of the vacuum membrane, a wide vacuum channel may be placed opposite the central longitudinal zone 6, but in this case the risk of forming air pockets increases, if the converging flow front does not "hit" the vacuum channel.

In the embodiment shown here, the inlet channels are included in the membrane bag. Alternatively Ω-shaped profile bodies known per se or perforated tubes may be applied. The vacuum channels 16 can also be formed like Ω-shaped profile bodies or perforated tubes. If perforated vacuum tubes are used, they can optionally be reinforced with a spiral-shaped rigid body, which extends inside the tube and prevents the latter from collapsing due to the vacuum.

From this description it is obvious to a person skilled in the art that the intermediate distribution layer interrupted by a zone without any distribution layer is the primary object of the invention. The width of this zone can be determined by tests with any moulding.

According to the embodiment shown here, the distribution layer 4 includes two distribution layer areas 4a, 4b, which are divided by a central zone 6. However, the distribution layer 4 can also include one distribution layer area only, as zone 6 then is placed between this distribution layer area and one end of the fibre insertion.

LIST OF REFERENCE NUMERALS

1 First lateral face of main laminate
2 Second lateral face of main laminate
3 Fibre insertion/main laminate
4 Distribution layer
4a First distribution layer area
4b Second distribution layer area
5 Semi-permeable membrane
6 Central zone
7, 8 Inlet channels
9, 10 Flow fronts
11 Additional distribution layer
12 Balsa
13 Welding seems
14 Perforations
15 Vacuum channel
16 Additional vacuum channels
17 Liquid polymer
18 Solid mould part
19 Vacuum bag
20 Reinforcement of front edge
21 Reinforcement of rear edge
22 Fibre material
23 Membrane bag
24 Gas-impermeable cloth

The invention claimed is:

1. Method of producing an oblong shell member made of fibre composite material by means of vacuum infusion, the method comprising: impregnating the fibre material with liquid polymer, and shaping the fiber composite material in a mould with a mould cavity, in which a fibre insertion (3) with a first lateral face (1) and a second lateral face (2) is placed, and where said fibre insertion further includes a plurality of fibre layers and a distribution layer (4), said distribution layer allowing a higher rate of flow for the liquid polymer than the fibre layers, a semi-permeable membrane (5) being placed opposite the first lateral face (1) of the fibre insertion, said semi-permeable membrane being substantially permeable to gasses and substantially impermeable to liquid polymer and further communicating with a vacuum source, characterized in that the distribution layer (4) is placed inside the fibre insertion (3) with fibre layers of the fibre insertion on both sides and is interrupted by a zone (6), and that the width of the zone (6) is smaller than the width of the fibre insertion (3), said zone extending in the longitudinal direction of the shell member and being positioned opposite the semi-permeable membrane (5), and in that liquid polymer is directed via inlet channels (7, 8) to the distribution layer (4), thus creating a flow front (9, 10) between the distribution layer (4) and the second lateral face (2), said flow front moving through the zone (6) towards the semi-permeable membrane (5).

2. Method according to claim 1, characterized in that liquid polymer is directed from inlet channels (7, 8) to the distribution layer (4) via an intermediate distribution layer (12) placed between the distribution layer (4) and the inlet channels (7, 8).

3. Method according to claim 1, characterized in that the thickness of the fibre material (22) of the fibre insertion (3) between the inlet channels (7, 8) and the distribution layer (4) is limited in such a way that the liquid polymer is directed to the distribution layer (4) before liquid polymer flows towards the zone (6) predominantly through the fibre material (22).

4. Method according to claim 1, characterized in that liquid polymer is directed from the inlet channels (7, 8) to the distribution layer (4) via a direct connection, such as one or more channels between the inlet channels (7, 8) and the distribution layer (4).

5. Method according to claim 1, characterized in that the zone (6) is a central zone (6), dividing the distribution layer (4) into two distribution layer areas (4a, 4b), and in that liquid polymer is directed via the inlet channels (7, 8) to the two distribution layer areas (4a, 4b) thus creating two flow fronts (9, 10) between the distribution layer (4) and the second lateral face (2), said flow fronts converging in the fibre insertion (3) to a common flow front (9, 10) moving through the central zone (6) towards the semi-permeable membrane (5).

6. Method according to claim 2 characterized in that an additional distribution layer (11) is placed at the second lateral face (2) of the fibre insertion (3).

7. Method according to claim 6 characterized in that the intermediate distribution layer (12) furthermore extends substantially down to the additional distribution layer (11).

8. Method according to claim 1 characterized in that the fibre insertion (3) forms a main laminate, which is a longitudinal reinforcement section in a blade shell half for a blade of a wind turbine.

9. Method according to claim 8, characterized in that the main laminate (3) is 10 to 100 mm thick and 30 to 200 cm wide.

10. Method according to claim 9, characterized in that the semi-permeable membrane (5) at a maximum is as thick as the main laminate is wide, and in that a non-permeable vacuum bag (19) extends at each side of the semi-permeable membrane (5) to the edges of the blade shell half.

11. Method according to claim 10, characterized in that the zone (6) is 100 to 200 mm wide.

12. Method according to claim 8, characterized in that vacuum channels (16) are provided along the edges of the blade shell half.

13. Method according to claim 8, characterized in that inlet channels (7, 8) are provided along the longitudinal edges of the semi-permeable membrane (5).

14. Method according to claim 13, characterized in that an oblong membrane bag with a front, a back, a central vacuum channel (15) and two inlet channels (7, 8) is applied, said two inlet channels extending on their respective sides of the vacuum channel (15), where the front opposite the vacuum channel (15) is formed by the semi-permeable membrane (5) and the front opposite the inlet channels (7, 8) is permeable to liquid polymer.

15. Method according to claim 14, where the membrane bag (23) includes a semi-permeable membrane material (5) and a non-permeable cloth (24), which are joined in the longitudinal direction, for instance by means of welding, to form the longitudinal vacuum channel (15) and the inlet channels (7, 8) on each side of said longitudinal vacuum channel, where the semi-permeable membrane material in the area of the inlet channels (7, 8) is perforated so that it is permeable to liquid polymer.

16. Method according to claim 15, wherein the semi-permeable material (5) and the non-permeable cloth (24) are joined by means of welding.

17. Method according to claim 8, characterized in that the main laminate (3) is 20 to 80 mm thick and 40 to 150 cm wide.

18. Method according to claim 8, characterized in that the main laminate (3) is 30 to 50 mm thick and 50 to 120 cm wide.

19. Method according to claim 10, characterized in that the zone (6) is 120 to 180 mm wide.

20. Method according to claim 10, characterized in that the zone (6) is 130 to 170 mm wide.

21. Method of producing an oblong shell member made of fibre composite material by means of vacuum infusion, the method comprising: impregnating the fibre material with liquid polymer, and shaping the fiber composite material in a mould with a mould cavity, in which a fibre insertion (3) with a first lateral face (1) and a second lateral face (2) is placed, and where said fibre insertion further includes a plurality of fibre layers and a distribution layer (4), said distribution layer allowing a higher rate of flow for the liquid polymer than the fibre layers, a semi-permeable membrane (5) being placed opposite the first lateral face (1) of the fibre insertion, said semi-permeable membrane being substantially permeable to gasses and substantially impermeable to liquid polymer and further communicating with a vacuum source, characterized in that the distribution layer (4) is placed inside the fibre insertion (3) with fibre layers of the fibre insertion on both sides and is interrupted by a zone (6), and that the width of the zone (6) is smaller than the width of the fibre insertion (3), said zone extending in the longitudinal direction of the shell member and being positioned opposite the semi-permeable membrane (5), and in that liquid polymer is directed via inlet channels (7, 8) to the distribution layer (4), thus creating a flow front (9, 10) between the distribution layer (4) and the second lateral face (2), said flow front moving through the zone (6) towards the semi-permeable membrane (5), characterized in that the fibre insertion (3) forms a main laminate, which is a longitudinal reinforcement section in a blade shell half for a blade of a wind turbine, wherein the width of the zone (6) is at least 2 times greater than the thickness of the piece of the main laminate.

22. Method according to claim 21, wherein the width of the zone (6) is at least 3 times greater than the thickness of the piece of the main laminate.

23. Method according to claim 21, wherein the width of the zone (6) is approximately 5 times greater than the thickness of the piece of the main laminate.

24. Method according to claim 21, characterized in that the main laminate (3) is 10 to 100 mm thick and 30 to 200 cm wide.

* * * * *